USO05473746A

United States Patent [19]
Pritt et al.

[11] Patent Number: 5,473,746
[45] Date of Patent: Dec. 5, 1995

[54] INTERACTIVE GRAPHICS COMPUTER SYSTEM FOR PLANNING STAR-SENSOR-BASED SATELLITE ATTITUDE MANEUVERS

[75] Inventors: Mark D. Pritt, Frederick; Thomas B. Greening, North Bethesda, both of Md.

[73] Assignee: Loral Federal Systems, Company, Bethesda, Md.

[21] Appl. No.: 42,238

[22] Filed: Apr. 1, 1993

[51] Int. Cl.$^6$ ................................................. G06F 3/14
[52] U.S. Cl. .......................... 395/161; 395/155; 364/459; 318/582
[58] Field of Search ................................. 395/161, 155, 395/156, 157, 159, 127, 152; 364/455, 434, 459; 318/582

[56] References Cited

U.S. PATENT DOCUMENTS

| | | | |
|---|---|---|---|
| 4,658,361 | 4/1987 | Kosaka et al. | 364/434 |
| 4,674,715 | 6/1987 | Frisch | 244/171 |
| 4,680,718 | 7/1987 | Sasaki et al. | 364/455 |
| 4,746,976 | 5/1988 | Kamel et al. | 364/455 X |
| 4,944,587 | 7/1990 | Harigae | 364/455 X |
| 5,177,686 | 1/1993 | Böinghoff et al. | 364/459 |
| 5,202,961 | 4/1993 | Mills et al. | 395/159 |
| 5,212,480 | 5/1993 | Ferro | 364/434 X |

OTHER PUBLICATIONS

Analytical Graphics "In-View", Jan. 1993, pp. 1–4.
Automatic brochure relating to Omni, Apr. 22, 1992, pp. 1–3.
J. Guidance, Jan.–Feb. 1984, Hayati et al., Science Platform & Attitude Sub-System In-Flight Calibration for the Galileo Spacecraft, pp. 29–35.
IEEE Transactions on Aerospace & Electronics Systems, vol. AES–18 No. 1, Jan. 1982, Simultaneous Calibrations of Voyager Celestial & Inertial Attitude Control Systems in Flight, M. H. Jahanshahi, pp. 21–28.
AIAA Guidance, Navigation & Control Conference, Portland, Oreg., Aug. 20–22, 1990, High–Accuracy Attitude Determination for the X–Ray Satellite ROSAT, T. Rupp, et al., pp. 554–561.
J. Guidance, Nov.–Dec. 1983, Smith, et al., Shuttle Orbiter Stellar–Inertial Reference System, pp. 424–431.
J. Guidance, Jan.–Feb. 1981, Shuster et al., Three–Axis Attitude Determination from Vector Observations, pp. 70–77.
J. Guidance, May–Jun. 1982, Wong et al., Celestial Referenced Attitude Determination of Galileo Spacecraft, pp. 307–312.
J. Guidance, Jan.–Feb. 1983, Birnbaum et al., A Radiation–Hardened Star Scanner for Spacecraft Guidance & Control, pp. 39–46.

(List continued on next page.)

*Primary Examiner*—Raymond J. Bayerl
*Assistant Examiner*—Crescelle N. dela Torre
*Attorney, Agent, or Firm*—Whitham, Curtis, Whitham & McGinn

[57] ABSTRACT

Interactive graphical attitude maneuver planning computer system for planning satellite attitude maneuvers allows a user to immediately see where star trackers are pointing when the attitude and orbital position of a satellite are varied on the computer system. The computer system includes a graphics display on which the celestial sphere, centered at the satellite rather than the Earth, is projected. The horizontal axis of the display measures the Right Ascension angle, while the vertical axis measures the Declination angle. The display shows, in addition to stars, the region of the sky occluded by the Earth and interference regions around the moon, sun and planets, in which the star trackers should not point, and the fields of view of the star trackers. The attitude of the satellite is adjusted by means of graphical slider bars which vary the roll, pitch and yaw angle rotations. As the slider bars are adjusted, the star trackers move across the sky, and the stars pass through their fields of view, making it immediately obvious to the user where the star trackers are pointing, whether or not they will detect certain stars, and whether or not they will point too closely to the Earth, moon, sun, or planets.

12 Claims, 18 Drawing Sheets

OTHER PUBLICATIONS

AIAA/AAS Astrodynamics Conference, Palo Alto, Calif., Sep. 11–12, 1972, Star Scanner Attitude Determination for the OSO–7 Spacecraft, Mackison et al., pp. 262–267.

AIAA 19th Aerospace Sciences Meeting, St. Louis, Mo., Jan. 12–15, 1981, Space Telescope Orbital Viewing Constraints, T. J. Sherrill, pp. 118–124.

J. Spacecraft, Vo. 28, No. 5, Sep.–Oct. 1991, Mars Observer Spacecraft Description, Dennis L. Potts, pp. 507–513.

J. Guidance, Mar.–Apr. 1991, Star Pattern Identification Aboard an Inertially Stabilized Spacecraft, Jean Claude Kosik, pp. 230–235.

J. Guidance, vol. 14, No. 2, 1991, New Star Identiciation Technique for Attitude Control, B. V. Sheela, et al, pp. 477–480.

J. Guidance, Nov. 1984, Star–Sensor–Based Satellite Attitude/Attitude Rate Estimator, E. Gai, et al.

J. Guidance, vol. 5, No. 4, Jul.–Aug. 1982, In–Flight Estimation of Spacecraft Attitude Sensor Accuracies and Alignments, M. D. Shuster, pp. 339–343.

James R. Wertz, Spacecraft Attitude Determination & Control, D. Reidel Publishing Co., Boston, Mass., 1978, pp. 1–21, 184–195, 254–266, 660–675, 703–709 and 787–797.

Θ = Angular Radius of Earth sin Θ = R/p

| 10 | 9 | 8 | 7 | 6 | 5 | 4 | 3 | 2 | 1 |
|---|---|---|---|---|---|---|---|---|---|
| 1 | 1 | 0 | 1 | 1 | 1 | 0 | 1 | 0 | 0 |

STARS 1,2,4 and 8 ARE TURNED OFF

DRAWING MASK

0011

| INDEX | COLOR |
|---|---|
| 00XX | BLACK |
| 01XX | WHITE |
| 10XX | RED |
| 11XX | BLUE |

FIG. 19A

DRAWING MASK

1100

| INDEX | COLOR |
|---|---|
| XX00 | BLACK |
| XX01 | WHITE |
| XX10 | RED |
| XX11 | BLUE |

FIG. 19B

INTERACTIVE GRAPHICS COMPUTER SYSTEM FOR PLANNING STAR-SENSOR-BASED SATELLITE ATTITUDE MANEUVERS

BACKGROUND OF THE INVENTION

1. Field of the Invention

The present invention generally relates to a tool for simulating the motions of a satellite in a visual and interactive manner and, more particularly, to a computer system that displays the sky from the point of view of a satellite along with the fields of view of the satellite's star sensors. The invention allows the user to vary interactively the motions of the satellite so that a star-sensor-based attitude maneuver can be planned.

2. Description of the Prior Art

Many satellites use star sensors to determine their attitude, or orientation in space. Stars are identified by comparing their positions in the sensor with known positions obtained from a star catalog. The positions of the identified stars in the fields of view of the star sensors are used to determine the attitude of the satellite. The process of identifying the first few stars in the star sensors is called "stellar acquisition." It is necessary not only after separation from the launch vehicle, but also after a hardware or software error when the attitude of the satellite must be determined using little or no prior attitude information.

There are a number of star identification algorithms, the simplest of which searches the star catalog for the star closest to the unidentified star. This and other algorithms require that an initial attitude estimate be derived from coarse attitude sensors such as magnetometers or sun sensors before beginning the star identification. Due to the coarseness of this initial estimate, which may be accurate to within only a few degrees, the satellite's onboard software could easily confuse one star with another. For this reason a small star catalog is used consisting of bright and widely separated "acquisition stars." Because there are typically no more than thirty acquisition stars, they are easily missed by the star sensors.

The problem of stellar acquisition consists of planning attitude maneuvers to position the star sensors so they will detect acquisition stars. The star sensors must not be pointed too closely to the sun, moon or Earth, because they are easily damaged when pointed too closely (within twenty or thirty degrees) to a bright object. They also should not be pointed near planets, which can be mistaken for stars. To complicate matters, the Earth occludes different portions of the sky as the satellite orbits.

While star identification is usually performed by the onboard software of the satellite, stellar acquisition maneuvers are usually planned by ground-based human analysts. This planning has proven to be a difficult and time-consuming task even for highly skilled analysts. The following approach is typically adopted. A computer program is executed with the estimated attitude of the satellite as an input parameter. The program determines where the star sensors will be pointing and whether or not any acquisition stars will be detected by them. If not, the program is run again with a different attitude "guess" as the input parameter. This trial-and-error process is repeated until a suitable attitude is found.

SUMMARY OF THE INVENTION

It is therefore an object of the present invention to provide an interactive graphical attitude maneuver planning tool for planning satellite attitude maneuvers.

It is another object of the invention to provide an interactive computer system which allows a user to immediately see where star trackers are pointing when the attitude and orbital position of a satellite are varied on the computer system.

According to the present invention, there is provided an interactive computer system that reduces the time and skill-level required to plan stellar acquisition maneuvers. The computer system includes a graphics display on which the celestial sphere, centered at the satellite rather than the Earth, is projected. The horizontal axis of the display measures the Right Ascension angle, while the vertical axis measures the Declination angle. The display shows, in addition to stars, the region of the sky occluded by the Earth and interference regions around the moon, sun and planets, in which sensors of the star trackers should not point, and the fields of view of the star sensors. The attitude of the satellite is adjusted by means of graphical slider bars which vary the roll, pitch and yaw angle rotations. As the slider bars are adjusted, the star trackers move across the sky, and the stars pass through their fields of view. Thus, it is immediately obvious to the user where the star trackers are pointing, whether or not they will detect certain stars, and whether or not they will point too closely to the Earth, moon, sun, or planets. The orbital position of the satellite is controlled by varying the date and time. A simulation of the orbit can also be executed by depressing a push button on the computer system and controlling the speed and direction (forwards and backwards in time) by means of a slider bar.

In the preferred implementation of the invention, the graphics display comprises four main windows. The largest window occupies the top half of the screen and displays a map of the celestial sphere as seen from the satellite. This map displays the stars, the regions of the sky occluded by the Earth, sun, moon, and planets, and the fields of view of the star trackers. The lower half of the display is occupied by three windows. Two of the windows show a graphical representation of which stars are visible in each star tracker. The stars used by the satellite for attitude determination are distinguished from other stars and planets by means of color. The fourth window is the main "control panel". It contains three graphical slider bars for varying the roll, pitch and yaw angles of the satellite. It contains text entry windows for entering the date and time and an additional slider bar for stepping forwards or backwards in time. The fourth window also contains a "menu bar" that pops up menus for performing other functions.

In addition to varying the roll, pitch and yaw angles, entering the date and time, and stepping forwards and backwards in time, the user can perform the following functions:

point and click on the stars with a mouse or other pointing device to get identification information, such as star ID, location and visual magnitude;

point and click on the sun, moon and planets to get identification and location information;

choose the attitude control mode of the satellite as either a constant inertial attitude or an attitude that is constant relative to an earth-pointing Local Vertical frame;

specify the constant attitude relative to the attitude control mode in the form of an "offset quaternion" (the pitch, roll and yaw angles selected by the operator begin from this constant attitude);

specify the "star occultation bits", i.e., data bits that specify which stars in the satellite's star catalog are to be "on" or "off" ("on" stars are the stars which the satellite can identify);

save and retrieve the offset quaternions and the star occultation bits in data files;

choose the coordinate system in which the full sky is to be displayed;

change the dimensions of the field of view of each star tracker;

specify the sizes of the regions occluded by the Earth, sun, moon, and planets; and place the operation of the system in a "real time" mode in which the position of the satellite is updated automatically once per second.

The orbit of the satellite is propagated according to a standard Keplerian orbit with J2 perturbation term. Alternatively, the user can specify an "ephemeris table" containing the orbit information. The positions of the sun, moon and planets are propagated according to standard equations.

A particular feature of the invention is the display of the celestial sphere in what is called the Orbit Normal frame. This is a coordinate system in which the plane of the satellite's orbit is the same as the x-y plane. When the satellite is in the Local Vertical attitude control mode, the fields of view of the star trackers move horizontally across the graphics display. Horizontal lines are plotted on the display to show the operator exactly which stars will be seen by each star tracker. This feature greatly simplifies the planning of stellar acquisition maneuvers.

BRIEF DESCRIPTION OF THE DRAWINGS

The foregoing and other objects, aspects and advantages will be better understood from the following detailed description of a preferred embodiment of the invention with reference to the drawings, in which:

FIG. 19A is a table showing a drawing mask and color table definitions for a 4-bit graphics display;

FIG. 19B is a table showing the drawing mask and color table definitions changed when graphics draws to a second buffer are complex;

DETAILED DESCRIPTION OF A PREFERRED EMBODIMENT OF THE INVENTION

Figure 1:
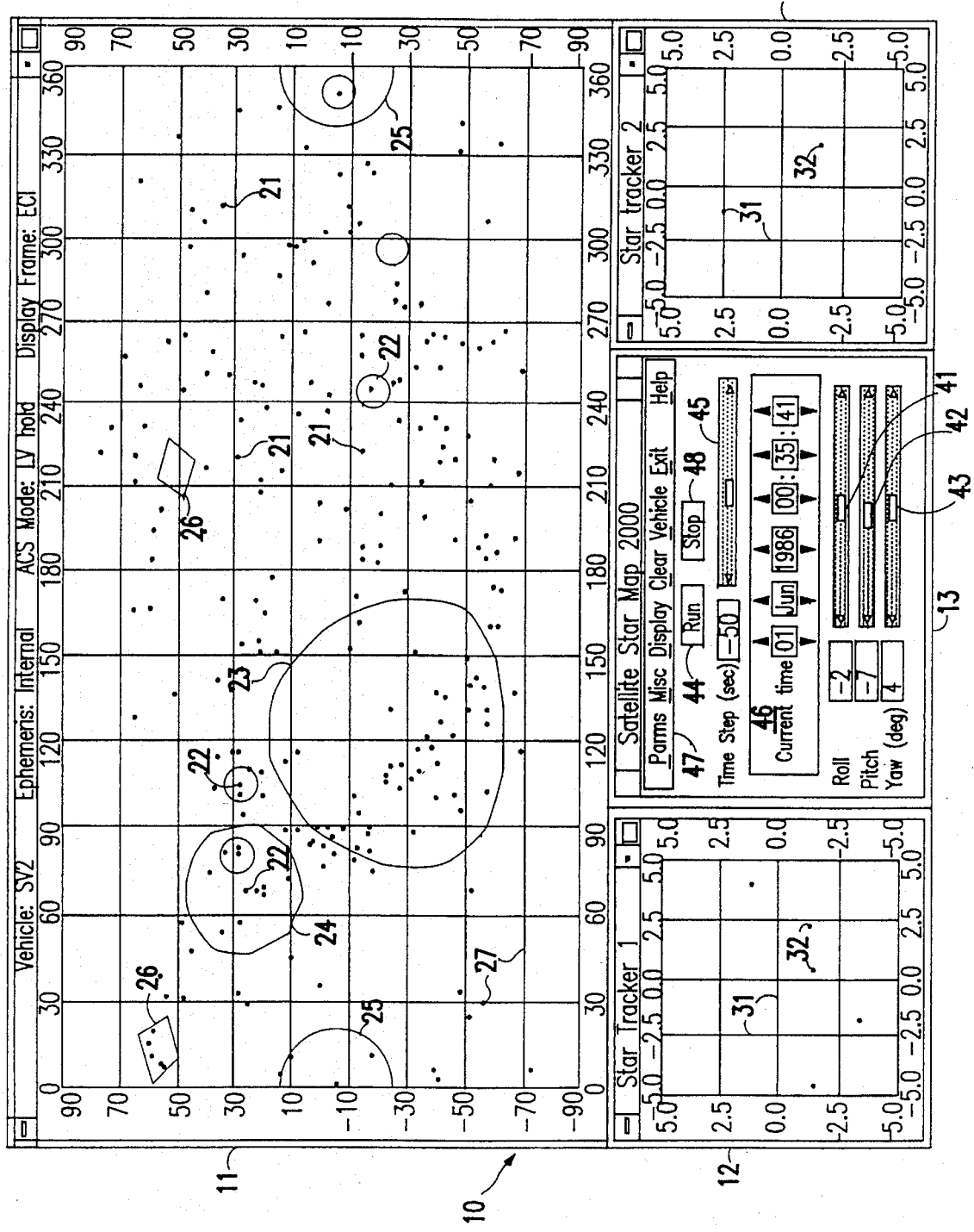
FIG. 1 is an illustration of a computer display showing four graphics windows.

Referring now to the drawings, and more particularly to FIG. 1, there is shown a computer generated display 10 comprising four windows 11, 12, 13, 14. In the top and largest window 11, there is shown the sky from the point of view of a satellite. The top window 11 shows stars 21, planets 22, the regions of the sky occluded by the Earth 23, the moon 24 and the sun 25, the fields of view of the star sensors 26, and grid lines 27. Enlarged fields of view of the star sensors are also displayed in smaller windows 12 and 14 in the lower left and right corners, respectively, of the display 10. The windows 12 and 14 show grid lines 31 and stars 32.

The window 13 is the control window. The attitude of the satellite is varied interactively by means of graphical slider bars 41 for roll, 42 for pitch and 43 for yaw. Movement of these slider bars, by means of a mouse or other pointing device, causes the display of the sky and star sensor fields of view to be updated immediately in windows 11, 12 and 14 to reflect the new attitude. As the slider bars 41, 42 and 43 are adjusted, the star sensors move across the sky, and stars pass through their fields of view. It is immediately obvious where the star sensors are pointing, whether or not they will detect acquisition stars, and whether or not they will point too closely to the Earth, moon, sun or planets.

The orbit of the satellite is simulated by depressing a graphical push button 44, labeled "RUN", and controlling the speed and direction (forwards or backwards in time) of the simulation using a graphical slider bar 45. The orbit is also controlled by incrementing or decrementing the date and time using graphical push buttons 46 like a digital watch. A main menu bar 47 provides the user with several selections which may be chosen by clicking with a mouse or other pointing device. Choosing one of these results in a pop-up menu being displayed from which the user may make other selections. While the simulation is running, the program remains interactive and the user can vary the speed of the animation, change parameters, and identify stars by making the appropriate selections from the menu bar 47 and the resulting pup-up menus. The pop-up menus allow the entry of orbital parameters, date and time, star sensor sizes and other parameters. The stars and planets are identified by pointing at them with a cursor controlled by a mouse or other pointing device. Star catalogs, star sensor coordinates and other parameters are stored in and retrieved from files. The simulation stops when the user depresses the push button labeled "Stop" 48.

It will be appreciated by those skilled in the art that the graphics control window 13 could be implemented in hardware in a special purpose computer console having physical slider bars, push buttons and the like. However, the preferred embodiment of the invention is to implement these functions in a graphics window in order to minimize the cost of the hardware and provide future flexibility in the software.

Figure 2:
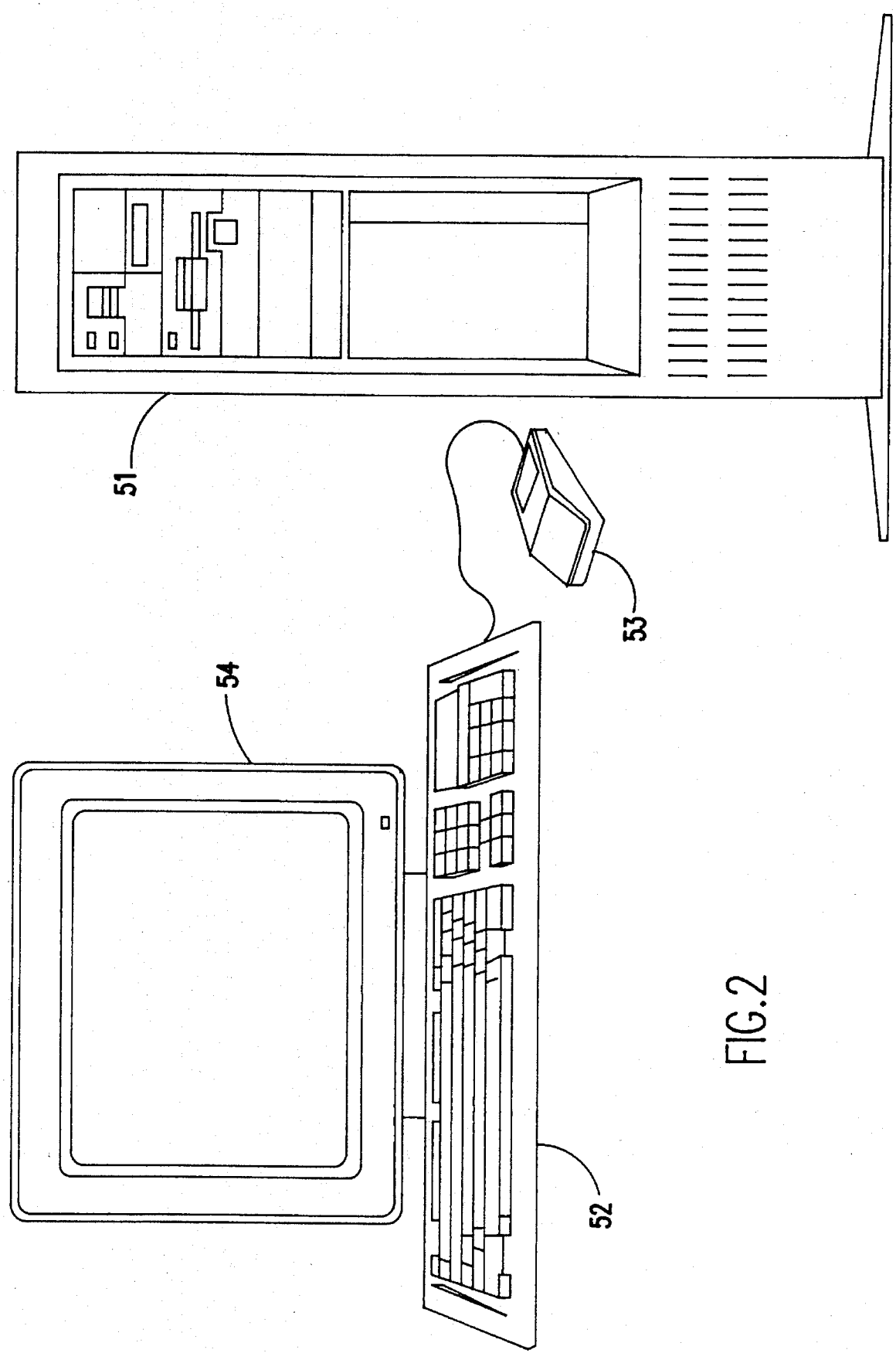
FIG. 2 is a block diagram showing the basic components of the hardware used in implementing the invention.

FIG. 2 shows the basic hardware required for implementing the preferred embodiment of the invention. A computer workstation 51 has both a keyboard 52 and mouse 53 as input devices and a high resolution graphics display 54. An example of a suitable workstation is the IBM RISC System/ 6000 workstation computer which uses a standard 1280× 1024 pixel 8-bit plane graphics display. The graphics display is managed by X-Windows running on a Unix® operating system, such as IBM's AIX (X-Windows is a trademark of MIT, Unix® is a trademark of Novell, and RISC System/ 6000 and AIX are trademarks of IBM).

Figure 3:
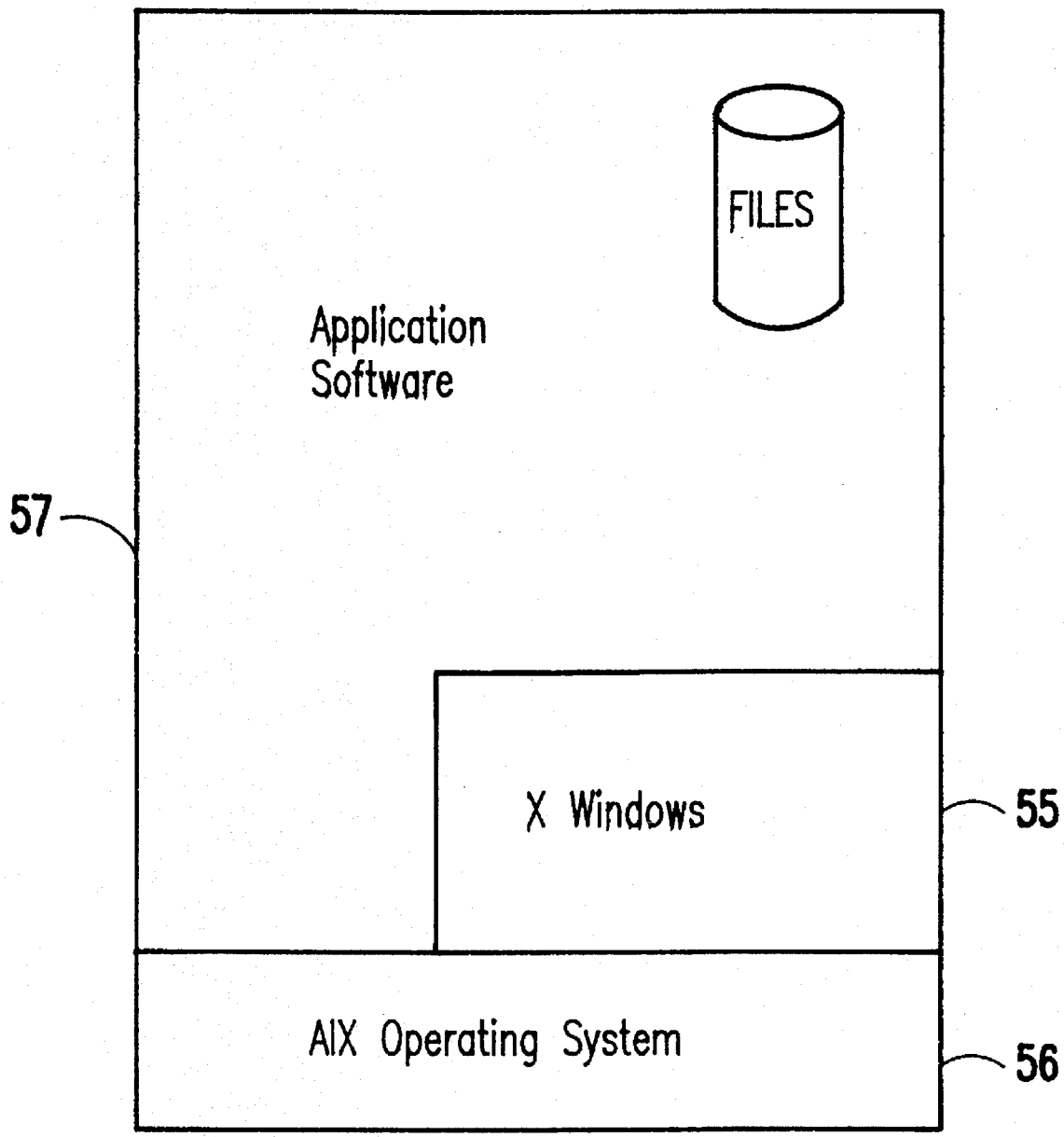
FIG. 3 is a block diagram showing the basic units of the software used in implementing the invention.

FIG. 3 shows the basic software configuration. X-Windows 55 runs on the AIX operating system 56 to manage the windows 11, 12, 13, and 14, slider bars 41, 42, 43, and 45, the various push buttons such as the run and stop buttons 44 and 48, and the pop-up menus selected from the menu bar 47. The application software 57 runs on top of the operating system 56 and the windows management software 55. The application software is preferably written in the C programming language. Further, the application software accesses data files 58 as may be required in response to user input by means of the mouse and keyboard.

The following sections describe in detail each feature or function of the invention. The following topics are covered:

1) determination of satellite attitude, star sensor orientation and star positions;
2) determination of satellite orbital position, planetary positions and the region of sky occluded by the Earth;
3) display of the sky;
4) display of the star sensor fields of view;
5) identification of stars and planets;
6) Local Vertical attitude;
7) Orbit Normal display frame;
8) quaternions;
9) star occultation bits;
10) data files;
11) event-driven structure of the software; and
12) animation.

SECTION 1. DETERMINATION OF SATELLITE ATTITUDE, STAR SENSOR ORIENTATION AND STAR POSITIONS

This section describes how the attitude of the satellite is determined from the settings of the graphical slider bars. It also describes how the orientations of the star sensors are determined and how the positions of stars in the star sensors are calculated.

Three coordinate frames are required for the determination of satellite attitude and star sensor orientation:

(1) the Each Centered Inertial (ECI) frame, which is fixed relative to the sky and the stars;
(2) the satellite body frame, which is fixed relative to the satellite;
(3) the star sensor frame (one frame for each sensor), which is fixed relative to the sensor.

Figure 4:
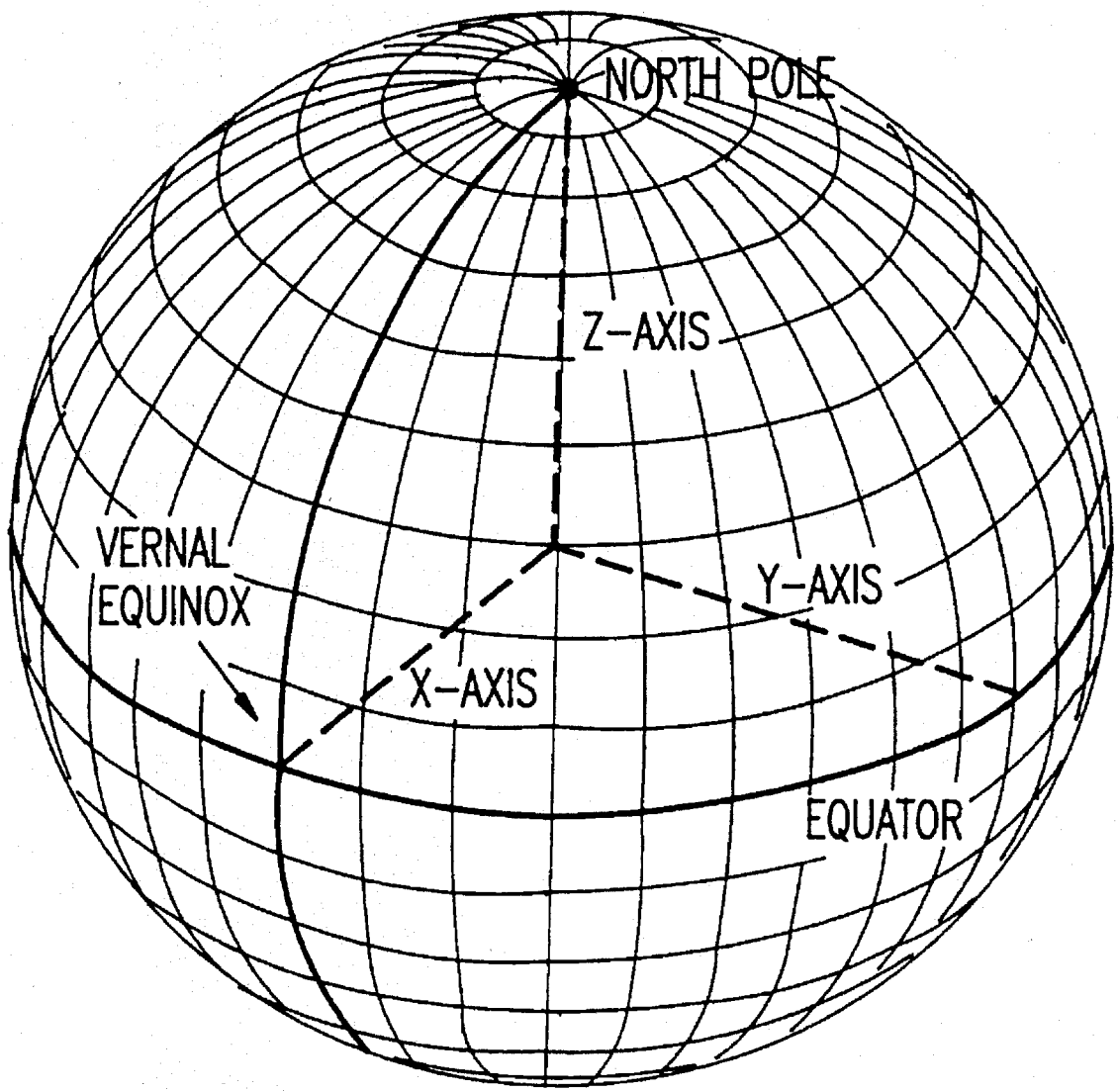
FIG. 4 is a pictorial diagram of the Earth Centered Inertial (ECI) frame.
Figure 5:
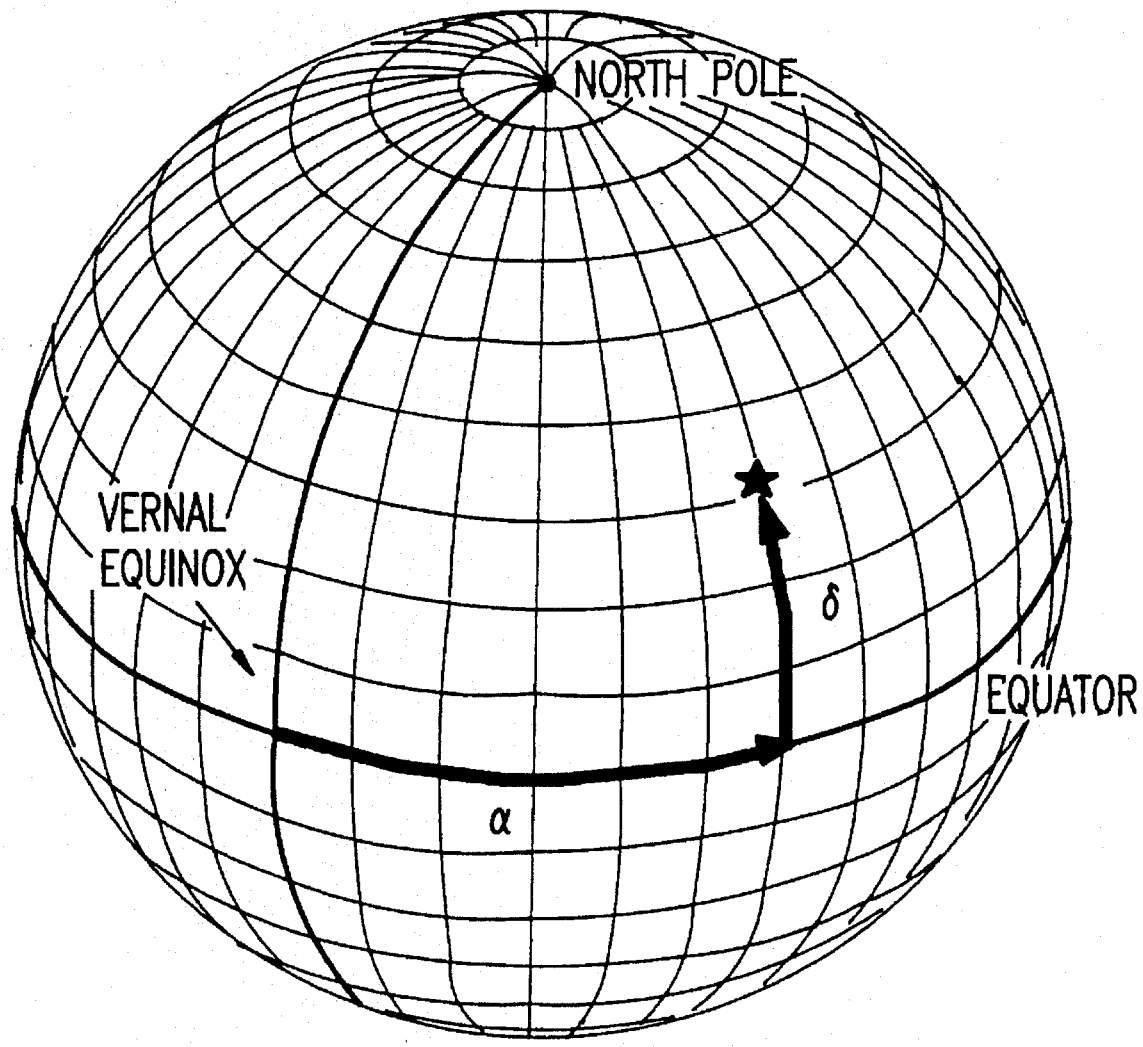
FIG. 5 is the pictorial diagram of FIG. 4 showing the right ascension and declination angles.

The ECI frame, shown in FIG. 4, is defined so that its z-axis points toward the north pole and its x-axis points toward the vernal equinox. Astronomers use it to catalog star positions. Star positions are given in terms of right ascension and declination angles, as shown in FIG. 5, which are analogous to longitude and latitude on the Earth.

A "coordinate transformation" is a 3×3 matrix that maps vectors from one coordinate frame to another. The attitude of the satellite can be expressed as the coordinate transformation from the satellite body frame to the ECI frame. This coordinate transformation is called the "attitude matrix". It can be specified as a triple of rotation angles about the coordinate axes of the satellite body frame. Rotation about the x-axis is called "roll", rotation about the y-axis is "pitch" and rotation about the z-axis is "yaw". The matrix given by the roll angle a is $$A = \begin{pmatrix} 1 & 0 & 0 \\ 0 & \cos(a) & -\sin(a) \\ 0 & \sin(a) & \cos(a) \end{pmatrix}$$

The matrix given by the pitch angle b is $$B = \begin{pmatrix} \cos(b) & 0 & \sin(b) \\ 0 & 1 & 0 \\ -\sin(b) & 0 & \cos(b) \end{pmatrix}$$

The matrix given by the yaw angle c is $$C = \begin{pmatrix} \cos(c) & -\sin(c) & 0 \\ \sin(c) & \cos(c) & 0 \\ 0 & 0 & 1 \end{pmatrix}$$

The attitude matrix T given by these roll, pitch and yaw angles is the matrix product T=ABC.

The three graphical slider bars 41, 42 and 43, shown in FIG. 1, control the attitude matrix: slider bar 41 varies the roll angle, slider bar 42 varies the pitch angle and slider bar 43 varies the yaw angle. As the slider bars 41, 42 and 43 are moved by the user, the attitude matrix T is computed according to the above equations.

The orientation of the star sensors is determined as follows. Let S be the coordinate transformation matrix from the star sensor frame to the satellite body frame. It is a fixed matrix that is defined by the way in which the sensor is mounted to the body of the satellite. Let U be the matrix product U=TS, where T is the attitude matrix of the satellite. Then the matrix U defines the orientation of the star sensor relative to the ECI frame. It transforms vectors from the star sensor frame to the ECI frame.

The matrix U transforms star positions from the star sensor field of view to the ECI frame as follows. The position (x,y) of a star in the star sensor field of view is given by an angular displacement x along the horizontal axis of the field of view and a displacement y along the vertical axis. Since the y-axis of the star sensor frame is usually the "boresight" or line-of-sight of the sensor and the x-axis and z-axis are usually the horizontal and vertical axes, respectively, the line-of-sight vector of the star position (x,y) is $$b = \begin{bmatrix} \sin(x)\cos(y) \\ \cos(x)\cos(y) \\ \sin(y) \end{bmatrix} \quad (1)$$

This vector is transformed to the ECI frame by the equation a=Ub. The vector $a=(a_1,a_2,a_3)^T$=Ub is converted to right ascension and declination angles (ra,dec) by the equations $$ra = \arctan\left(\frac{a_2}{a_1}\right) \quad (2)$$

$$dec = \arctan(a_3)$$

The preceding paragraph explains how the satellite converts the observed positions of stars in the star sensors to ECI right ascension and declination positions for comparison with stars in a star catalog. The invention, however, must perform the opposite conversion; that is, given star positions from a star catalog, it must calculate the positions in a star sensor's field of view. The following pseudocode shows how this is accomplished.

```
601   DO FOR all star sensors
602      Calculate the matrix U = TS, where S is the
            coordinate transformation from the star
            sensor frame to the satellite body frame,
            and T is the satellite attitude matrix
603      Let V be the matrix inverse of U
604      DO FOR all stars in the star catalog
605         Read a star position (ra,dec)
606         Compute the vector a=(cos(ra)cos(dec),
               sin(ra)cos(dec), sin(dec))
607         Calculate the vector b=(b1,b2,b3)=Va
608         Calculate the position (u,v) in the star
               sensor where u = arctan (b1/b2),
               v = arcsin (b3)
609         IF (u,v) falls within the field of view of
               the star sensor (e.g., the absolute
               values of u and v are both less than
               the angular radius of the star
               sensor)
610            THEN display a star at the position
                  (u,v) in the field of view
611      END DO FOR
612   END DO FOR
```

The right ascension and declination (ra,dec) of a star position is converted to a line-of-sight vector in line 606 by the following equation:

$$a = \begin{bmatrix} \cos(ra)\cos(dec) \\ \sin(ra)\cos(dec) \\ \sin(dec) \end{bmatrix} \quad (3)$$

This vector is converted to the star sensor frame in line 607 by applying the inverse V of the matrix U:

$$b = \begin{bmatrix} b_1 \\ b_2 \\ b_3 \end{bmatrix} = Va \quad (4)$$

In line 608 the following equations convert the vector b to a position (u,v) in the star sensor field of view:

$$u = \arctan\left(\frac{b_1}{b_2}\right) \quad (5)$$

$$v = \arctan(b_3)$$

Line 609 shows the test that is performed to determine if the star actually lies within the field of view of the star sensor; that is, the absolute values of u and v both must be less than the angular radius of the star sensor field of view.

SECTION 2. DETERMINATION OF SATELLITE POSITION, PLANETARY POSITIONS AND THE REGION OF SKY OCCLUDED BY THE EARTH

This section describes how the invention determines the orbital positions of the satellite and planets and how the region of sky occluded by the Earth is determined. The main factor influencing the orbits of satellites is the Earth's gravitational field with its perturbations caused by the equatorial bulge. There exist fast, simple and fairly accurate algorithms for computing the orbital positions of satellites. Similar algorithms compute the positions of the sun, moon and planets. These algorithms determine orbital position based on the time elapsed since the beginning of the orbit. The invention makes use of these algorithms to compute the positions of the satellite, sun, moon and planets. For greater accuracy the orbital positions can be computed by more sophisticated algorithms or derived from other sources (such as satellite telemetry) and stored in files called "ephemeris tables." These tables can be read by the invention, and orbital positions at arbitrary elapsed times are computed by standard interpolation techniques.

Figures 6, 13:
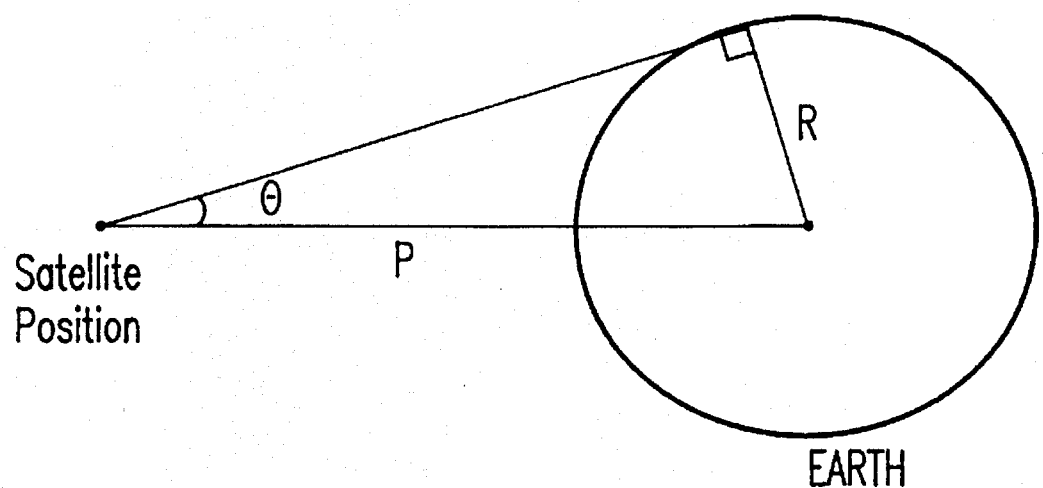
FIG. 6 is a geometric diagram showing the angular radius of the Earth as seen from a satellite.
FIG. 13 is a block diagram showing star occultation bits.

Given the orbital position P of the satellite in the ECI frame, the region of the sky occluded by the Earth is determined as follows. The position of the Earth in satellite-centered ECI coordinates is −P, and the angular radius of the Earth as seen from the satellite is $$r = \arcsin\left(\frac{R}{p}\right) \quad (6)$$

where R is the radius of the Earth and p is the length of the vector P, as shown in FIG. 6. The position vector −P and radius r define a circle that represents the region of sky occluded by the Earth.

SECTION 3. DISPLAY OF THE SKY

Figure 7A:
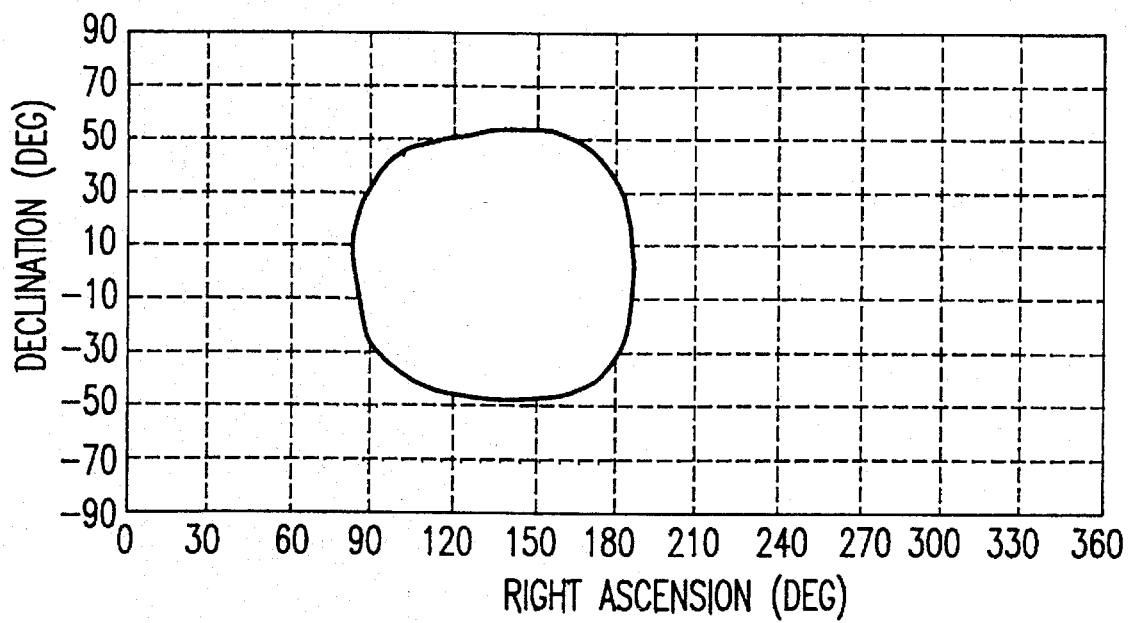
FIG. 7A is an illustration of the main window shown in FIG. 1 showing a region of sky occluded by the Earth.
Figure 7B:
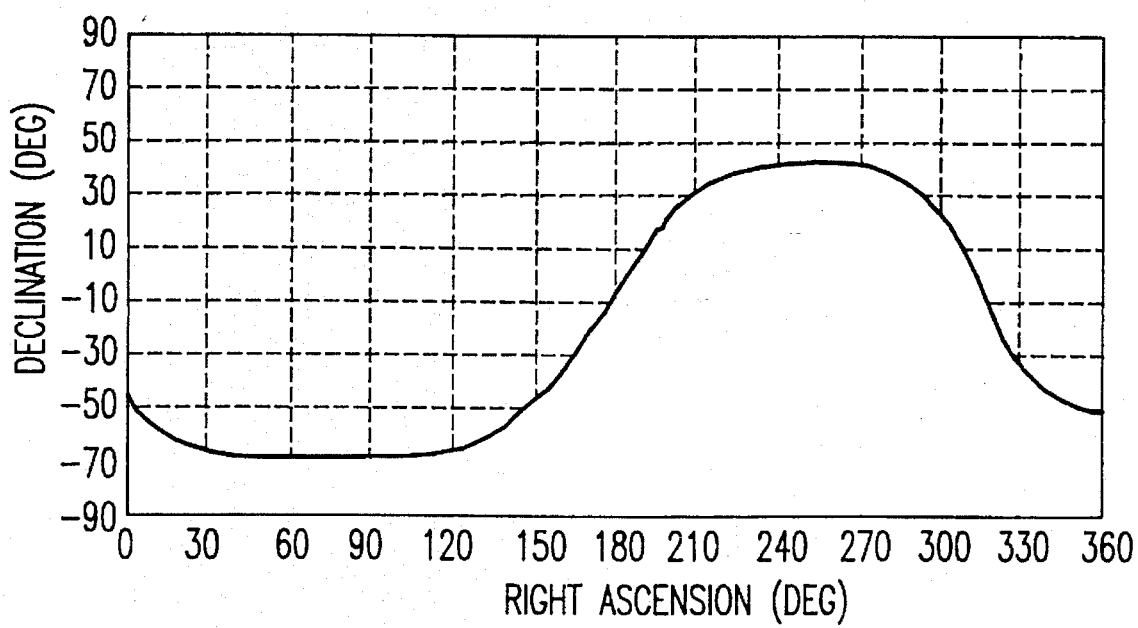
FIG. 7B is an illustration of the main window shown in FIG. 1 showing the region occluded by Earth becoming sinusoidal near the poles.
Figure 7C:
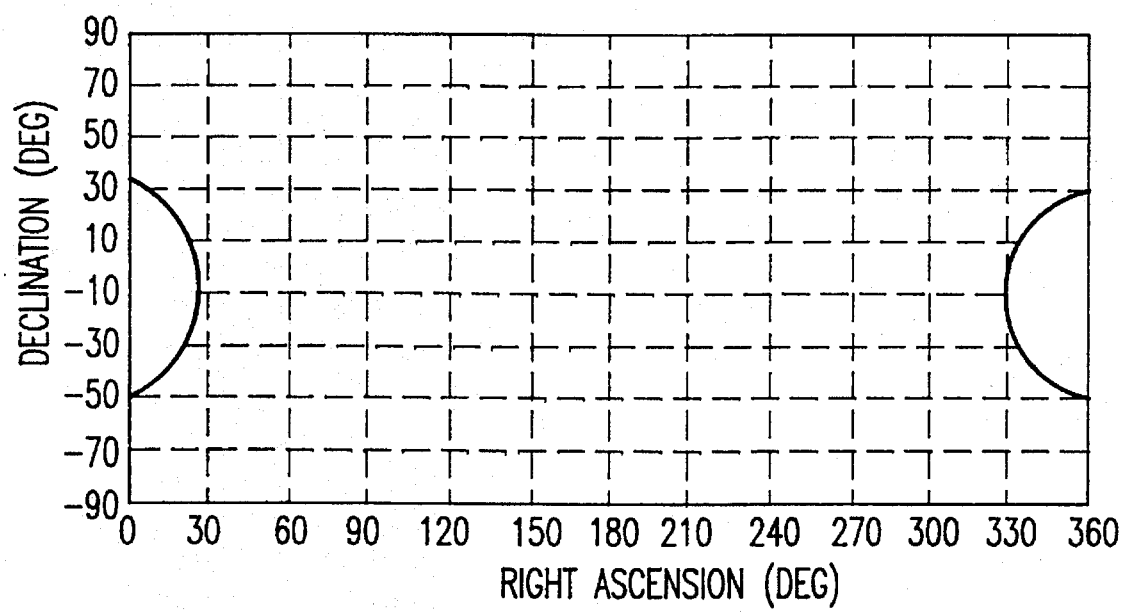
FIG. 7C is an illustration of the main window shown in FIG. 1 showing the region occluded by Earth splitting into two pieces at the edges.
Figure 8:
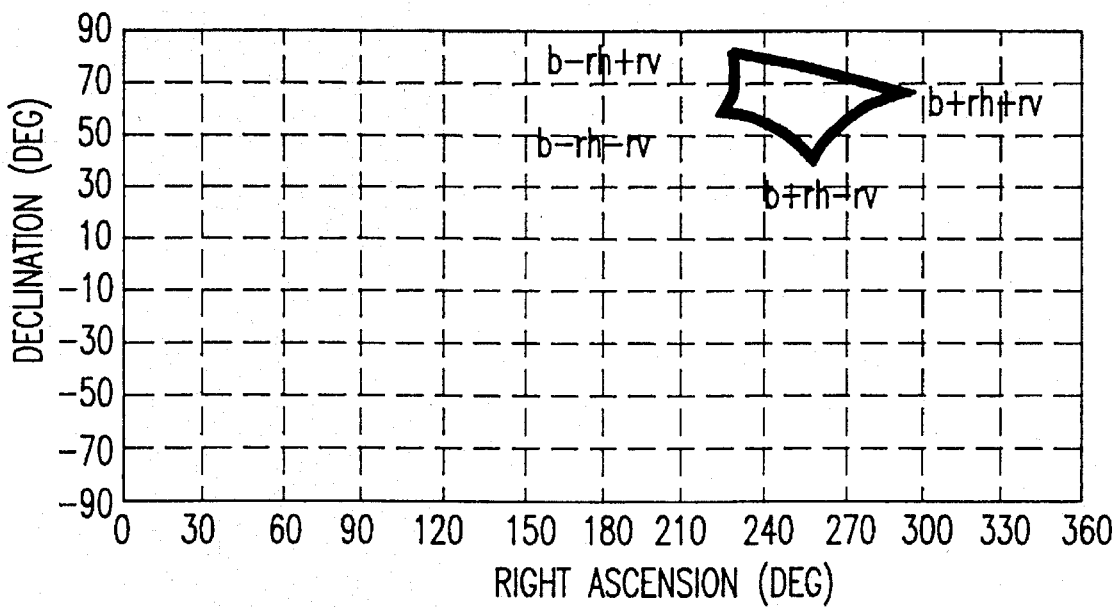
FIG. 8 is an illustration of the main window shown in FIG. 1 showing a star sensor field of view drawn on the display of the sky.

The invention shows the sky from the point of view of the satellite. The sky, which is regarded as a sphere of infinite radius (termed the "celestial sphere" by astronomers) centered at the satellite, is projected onto a flat display according to equations (2). The horizontal axis of the display measures right ascension, and the vertical axis measures declination. The following objects are drawn using the standard X-Windows graphics functions XDrawPoint, XDrawLine and XFillPolygon:

1) Grid lines: Horizontal and vertical grid lines are drawn and marked with right ascension and declination angles.
2) Stars: The stars, whose positions come from a star catalog, are drawn as small, white dots.
3) Planets: The planets, whose positions are determined according to Section 2, are drawn as small, white crosses.
4) Sun and Moon: The sun and moon are drawn as circular regions of sky into which the star sensors should not point.
5) Earth: The Earth is drawn as a circular region of sky representing the region occluded by the Earth. The region is not perfectly circular due to the distortions near the poles caused by the mapping of the celestial sphere onto the flat display. The region is drawn by taking evenly spaced points on the circle and projecting them to right ascension and declination angles according to equations (2). Care must be exercised near the poles and the edges of the display where the region may become sinusoidal or split into two pieces, as shown in FIGS. 7a to 7c.
6) Star sensors: The star sensor fields of view are square-shaped and are determined by the boresight vector and the horizontal and vertical axes of the fields of view. The boresight vector is $b=U(0,1,0)$, where U is the matrix defined in Section 2. The horizontal and vertical axes h and v of the field of view are defined analogously by using the vectors $(1,0,0)$ and $(0,0,1)$ in place of the vector $(0,1,0)$. The field of view is drawn on the display of the sky by projecting the four corners $b+rh+rv$ $b+rh-rv$ $b-rh-rv$ $b-rh+rv$ according to equations 2, where r is the angular radius of the sensor, as shown in FIG. 8.

SECTION 4. DISPLAY OF THE STAR SENSOR FIELDS OF VIEW

The invention displays enlarged views of the star sensor fields of view in windows 12 and 14 shown in FIG. 1. The star positions come from a star catalog and are converted from the ECI frame to each star sensor coordinate frame according to the method described in Section 1. Bright stars are displayed as large dots, while dim stars are displayed as smaller dots. Stars from the satellite's star catalog are drawn as white dots, while stars from a 35,000-star "full sky" star catalog are drawn as dim grey dots.

SECTION 5. IDENTIFICATION OF STARS AND PLANETS

Figure 9:
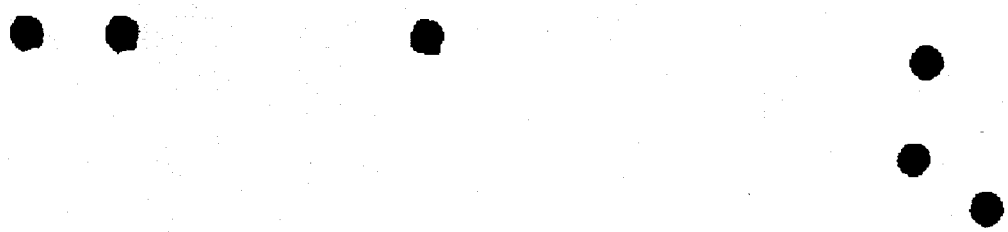
FIG. 9 is an illustration of the main window shown in FIG. 1 showing star identification.

The stars and planets can be identified by pointing at them with a cursor controlled by the mouse 53 (FIG. 2) or other pointing device. As shown in FIG. 9, one depression of the mouse button identifies the object, and the second depression shows all information about that object: visual magnitude, spectral type, and right ascension and declination position. The identifying information is displayed next to the star or planet with an arrow pointing to the star or planet. A third depression of the mouse button removes the information from the display.

SECTION 6. LOCAL VERTICAL ATTITUDE

Figure 10:
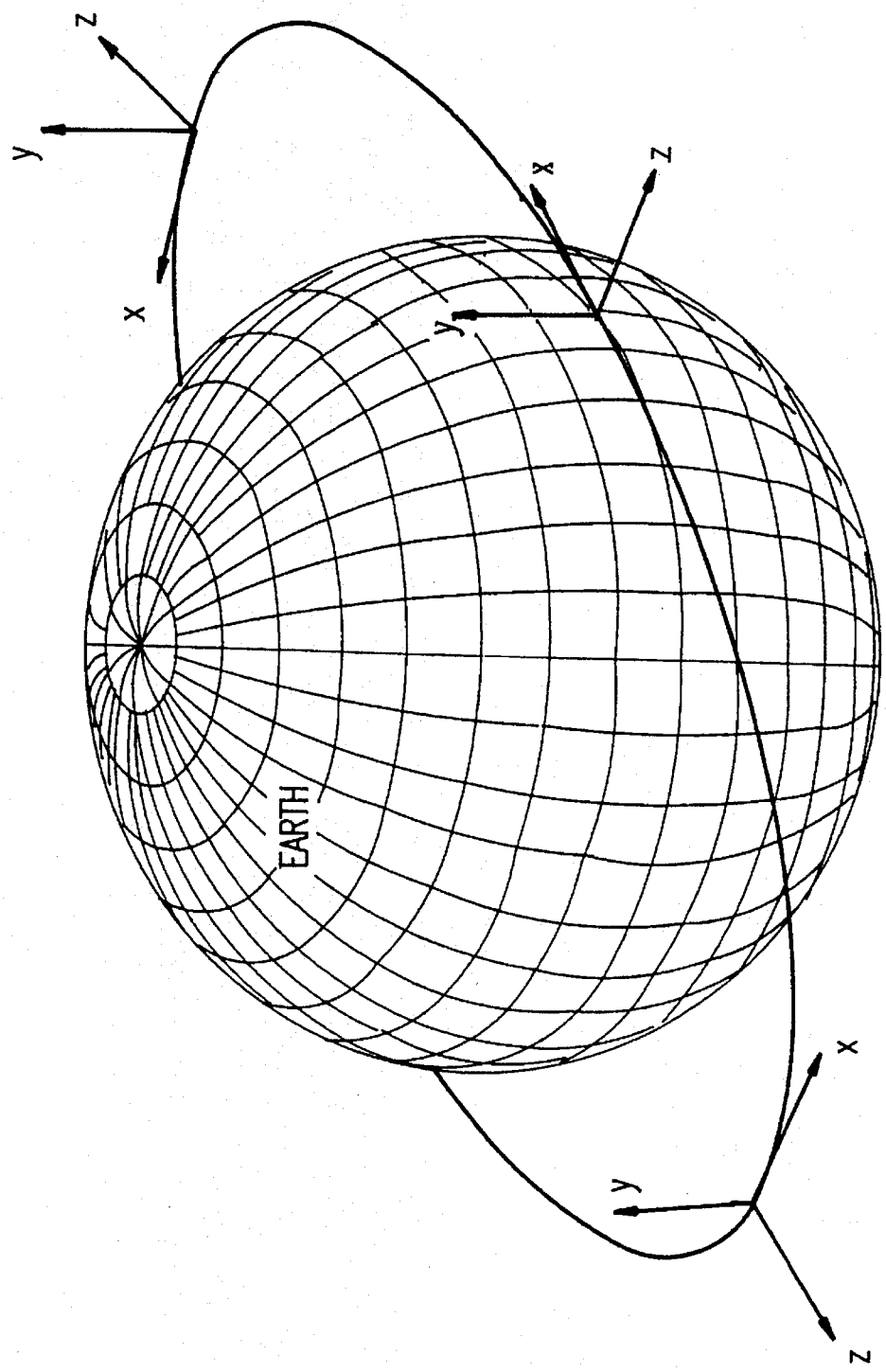
FIG. 10 is a pictorial diagram showing the Local Vertical (LV) frame of the satellite.

During stellar acquisition, the satellite's attitude may be fixed relative to the Local Vertical (LV) frame rather than the ECI frame. The LV frame, illustrated in FIG. 10, is centered at the satellite and its z-axis always points away from the center of the Earth. It rotates with respect to the ECI frame at the rate of one rotation per orbit. When the satellite's attitude is fixed relative to the LV frame, the star sensors scan the sky as the satellite orbits, thereby increasing the probability of detecting acquisition stars. If W is the coordinate transformation matrix from the LV frame to the ECI frame, and S is the coordinate transformation matrix from the satellite body frame to the LV frame, then WS is the attitude matrix of the satellite relative to the ECI frame. To determine the satellite attitude and the star sensor orientations, the invention computes the matrix W, which depends on the orbital position of the satellite, and follows the method described in Section 1 with the matrix product WS in place of the matrix S.

The matrix W is calculated as follows. Let P be the position vector and V the velocity vector of the satellite at a given point. Let Q be the vector cross product P×V, and let R be the vector cross product Q×P. Let the vectors P, Q and R be normalized. Then W is defined to be the matrix whose column vectors are R, Q and P, respectively.

SECTION 7. ORBIT NORMAL DISPLAY FRAME

Figure 11:
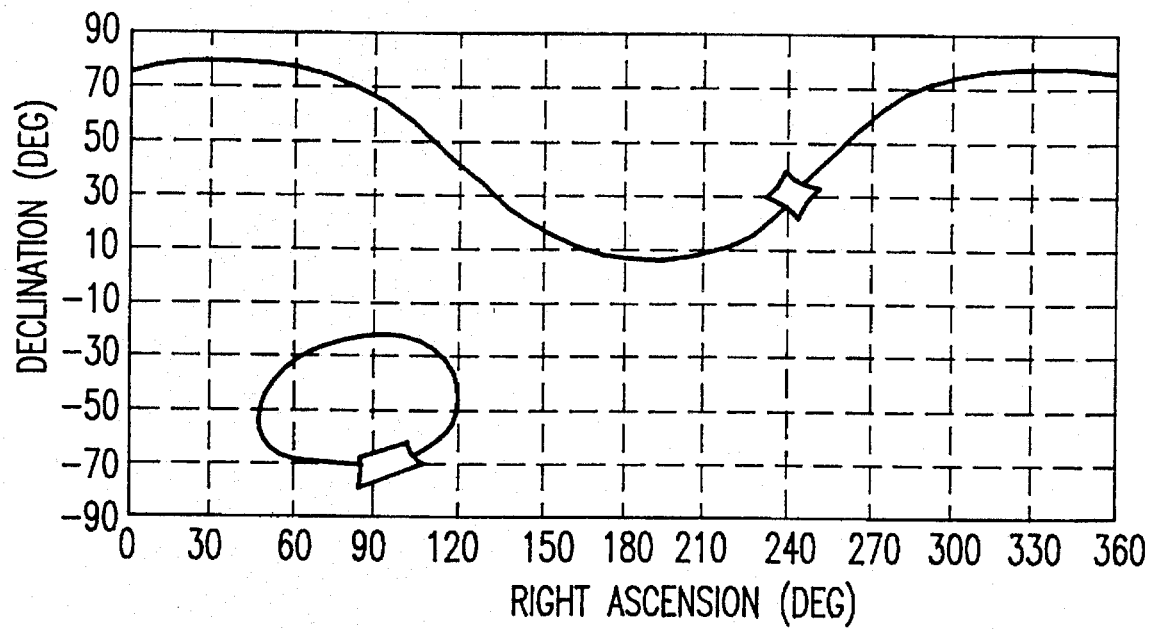
FIG. 11 is an illustration of the main window shown in FIG. 1 showing paths followed by the star sensors on the ECI display of the sky.
Figure 12:
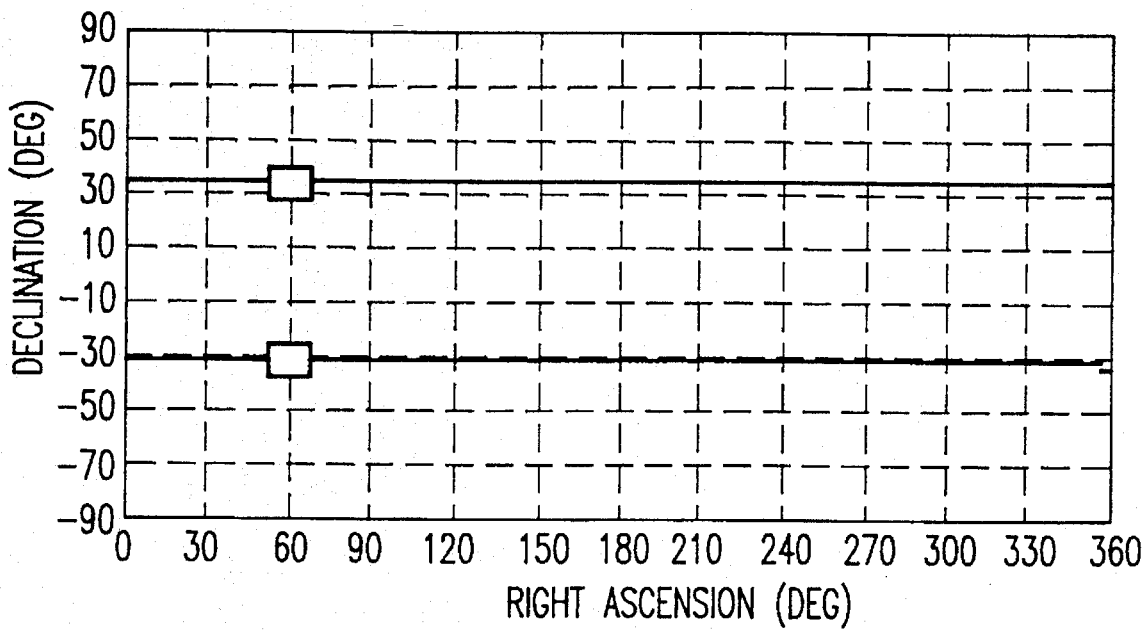
FIG. 12 is an illustration of the main window shown in FIG. 1 showing horizontal paths followed by the star sensors on the Orbit Normal display of the sky.

The invention offers the user the choice of another coordinate frame in which to display the sky in addition to the ECI frame. When the satellite attitude is fixed relative to the LV frame, the star sensors follow twisting sinusoidal paths across the display as the satellite orbits, as shown in FIG. 11. A more convenient coordinate frame for displaying the sky in this case is the Orbit Normal frame. This frame is the ECI frame in which the xy-plane has been rotated to match the satellite's orbital plane. In this coordinate frame, the star sensors move across the display in horizontal lines as shown in FIG. 12, making it immediately clear which stars will be detected in the course of an orbit.

SECTION 8. QUATERNIONS

For specifying satellite attitude, the invention uses quaternions in addition to roll, pitch and yaw angles. Quaternions are four-dimensional vectors which can be used in place of matrices to represent coordinate transformations. Most satellite onboard software uses quaternions rather than matrices for attitude calculations. The invention allows the user to enter an initial "offset quaternion", which specifies the satellite attitude before the effects of the roll, pitch and yaw angles are taken into account. The invention also calculates and displays the quaternion that results from combining the roll, pitch and yaw angles with the offset quaternion. After an attitude maneuver has been planned using the invention, the user can use this quaternion as part of the attitude maneuver command to be uplinked to the satellite.

SECTION 9. STAR OCCULTATION BITS

Satellite software ignores certain stars in the star catalog under certain modes of operation. These stars are masked out by strings of bits, where a 1-bit indicates a star is "on", and a 0-bit indicates a star is "off" and should be ignored, as shown in FIG. 13. The invention allows the user to enter these bits, and the "off" stars are then ignored and not displayed.

SECTION 10. DATA FILES

The invention offers the user the ability to save and retrieve files containing the following types of data:

(1) star catalogs
(2) ephemeris tables
(3) offset quaternions
(4) star occultation bits
(5) number, sizes and orientations of star sensors

SECTION 11. EVENT-DRIVEN STRUCTURE OF SOFTWARE

This section describes the event-driven structure of the invention. This event-driven structure is necessary for its interactive nature. Rather than consisting of statements to be executed sequentially, the software implementing the invention consists of functions which are executed when certain events occur. The events are stored on an event queue and processed by the X-Windows software 55 shown in FIG. 3. The X-Windows event handling software responds to user initiated events and perform functions appropriate to those events. The user initiated events include the following: move a roll, pitch or yaw slider bar 41, 42 or 43 in FIG. 1, press "RUN" or "STOP" buttons 44 or 48, depress mouse button while mouse cursor is in a graphics window, select a display frame (ECI or Orbit Normal), enter a new data/time using the buttons 46, enter a state vector, enter new star occultation bits, save parameters in file, retrieve parameters from file, delete file, retrieve an ephemeris table file, adjust the "time step" slider bar 45, enter a new offset quaternion, change screen colors, press the Exit button, and change the size of a star sensor. Some of these functions are initiated by the use by first selecting an option from the menu bar 47 and then making a further selection from the pop-up menu, as described in more detail below. The functions performed by X-Windows in response to user initiated events include the following: redisplay the main graphics window 11, redisplay the star sensor graphics windows 12 and 14, compute the attitude matrix, compute the star sensor orientations, draw identifying text next to a star or planet (as illustrated in FIG. 9), read the roll, pitch and yaw angles from the slider bars 41, 42 and 43, compute satellite position and velocity, compute positions of planets, draw planets, draw stars, draw sun, draw moon, draw Earth, draw star sensor fields of view, Exit, save parameters in a file, delete a file, and retrieve parameters from a file. For more information on X-Windows, the reader is referred to D. A. Young, The X Window System: Programming and Applications with Xt, OSF/Motif edition, Prentice-Hall, Englewood Cliffs, N.J. (1990).

Moving one of the slider bars 41, 42 or 43 is an example of an event that triggers the execution of functions which compute the attitude matrix, determine the orientations of the star sensors and display the sky and star sensor fields of view. The parameters, such as roll, pitch and yaw angles, attitude matrix, satellite state vector, current date and time, time step, planet positions, and the like, are stored in a data structure that is accessible by all the functions.

Figure 14:
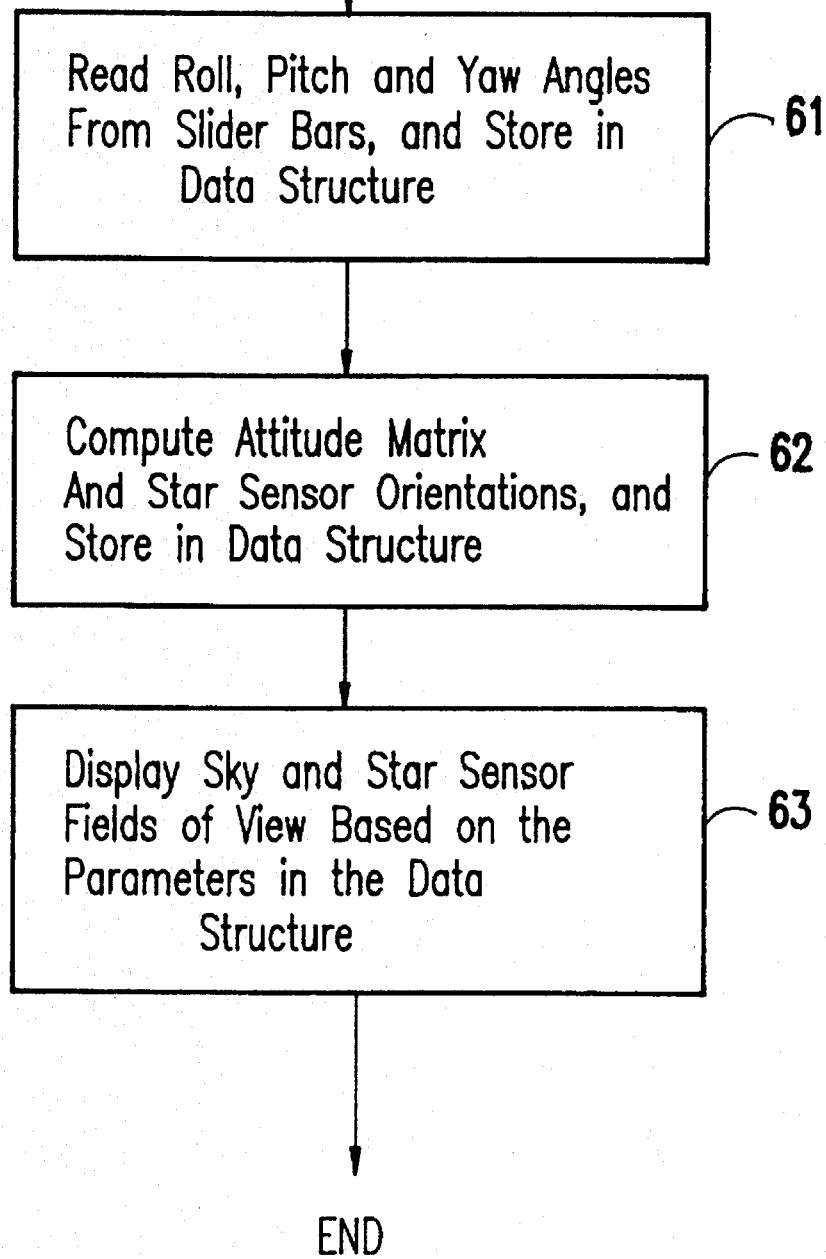
FIG. 14 is a flowchart showing the event driven logic implemented for animating display as a user adjusts slider bars for roll, pitch and or yaw.

FIG. 14 is a flowchart which illustrates the logic of the software for the event of moving one of the slider bars 41, 42 and/or 43 shown in FIG. 1. When the event is detected, the roll, pitch and yaw angles are read in function block 61 and stored in the data structure. Then the attitude matrix and star sensor orientations are computed in function block 62 and stored in the data structure. Finally, the sky and star sensor fields of view are displayed in function block 63.

Figure 15:
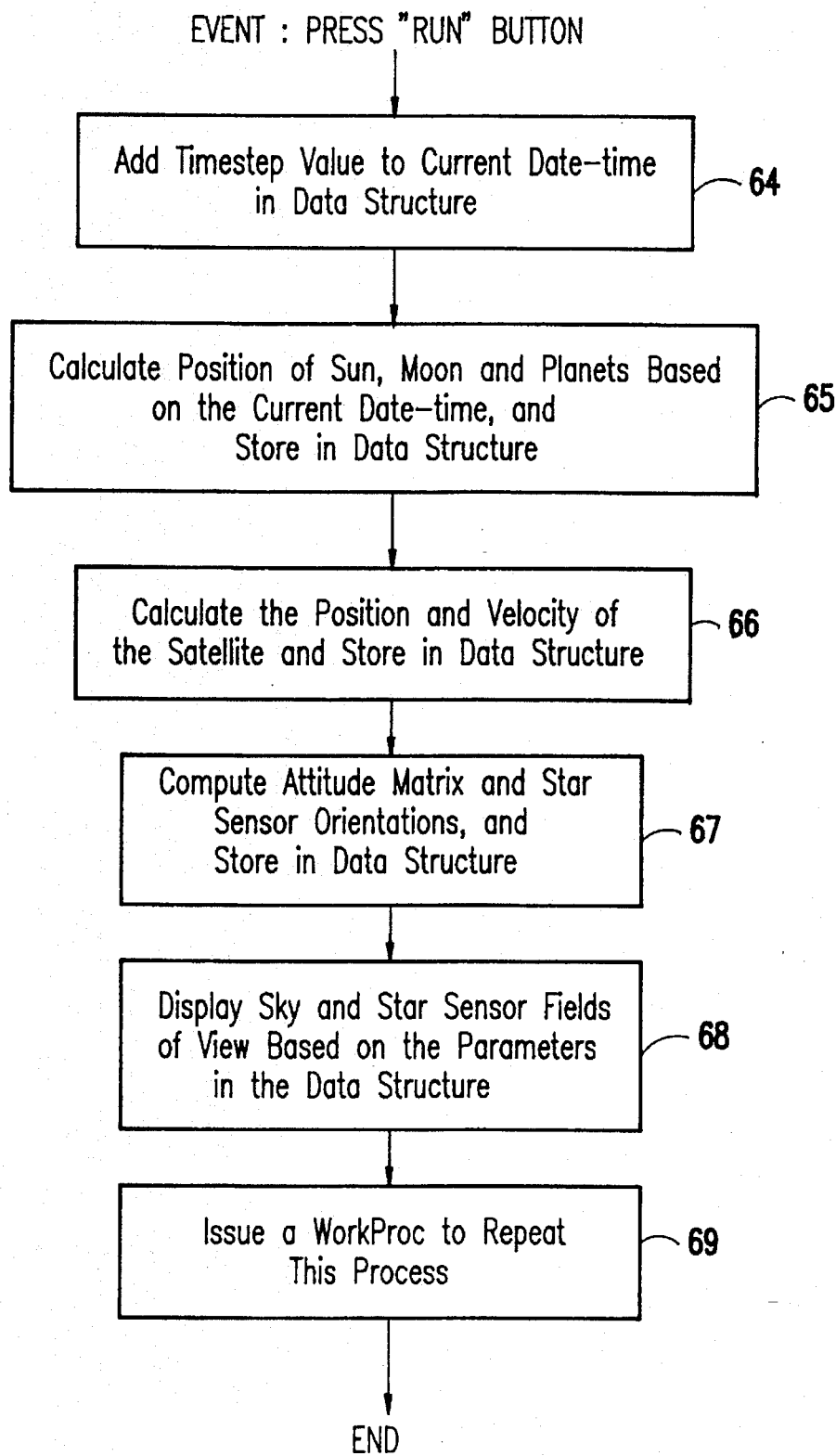
FIG. 15 is a flowchart showing the event driven logic implemented when a user presses the "RUN" button.

Depressing the "RUN" push button 44 shown in FIG. 1 is an event that triggers execution of these functions in addition to the functions which compute the orbital positions of the satellite, planets, sun and moon. FIG. 15 is a flowchart that illustrates the logic of the software for the event of depressing the "RUN" push button 44. When this event is detected, the time step is added to the current date and time in the data structure, and the positions of the planets, sun and moon are calculated in function block 65 based on the current date and time. The position and velocity of the satellite is calculated in function block 66 based on the current data and time and orbit parameters stored in the data structure. The attitude matrix and star sensor orientations are computed in function block 67. Each of these functions store the new parameters computed (i.e., planet positions, satellite positions, attitude matrix, etc.) in the data structure for use by other functions, such as the drawing function. The sky and star sensor fields of view are drawn and displayed in function block 68 using the parameters in the data structure. Finally, a WorkProc is issued in function block 69 which will cause the next step of the animation to be executed.

Figure 16:
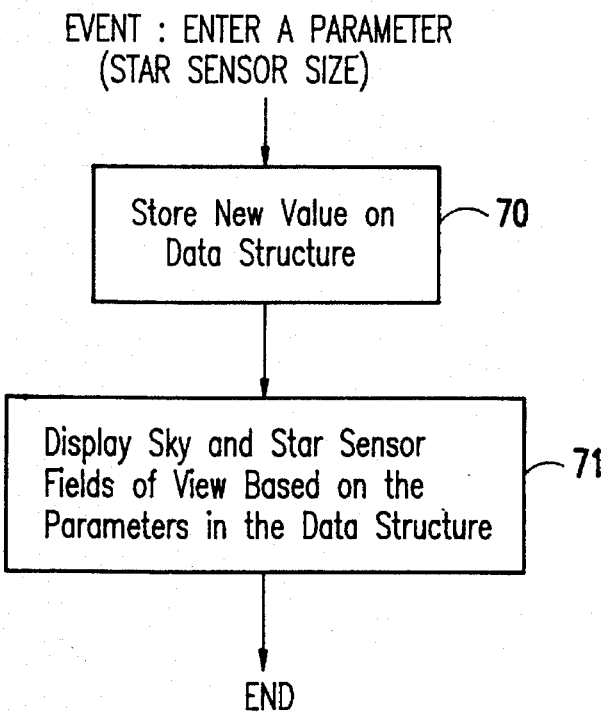
FIG. 16 is a flowchart showing the event driven logic implemented when a user inputs parameters relating to star sensor size.
Figure 17:
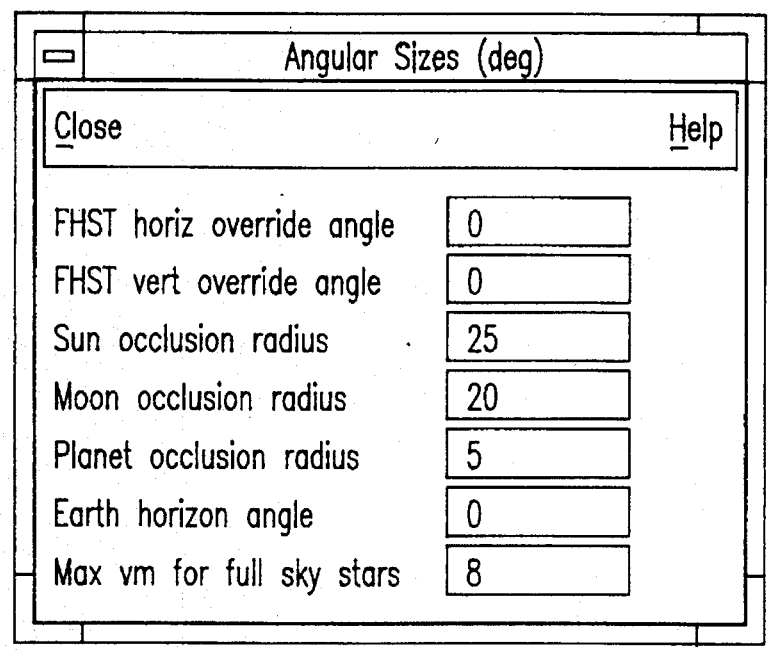
FIG. 17 is an illustration of the Angular Sizes pop-up menu which receives user input parameters relating to star sensor size and related parameters.

FIG. 16 is a flowchart that illustrates the logic of the software for the event of entering a parameter, in this case the size of the star sensors. This is done by selecting the Misc option from the main menu bar 47 followed by selecting the Angular Sizes option form the pop-up menu. This, in turn, results in the display of the Angular Sizes Window, shown in FIG. 17 which allows the user to enter desired values. When the event is detected in FIG. 16, the new value is stored in the data structure in function block 70, and the graphics windows are redisplayed in function block 71. The new value for the star sensor size will cause the star sensor fields of view to be drawn differently.

Figure 18:
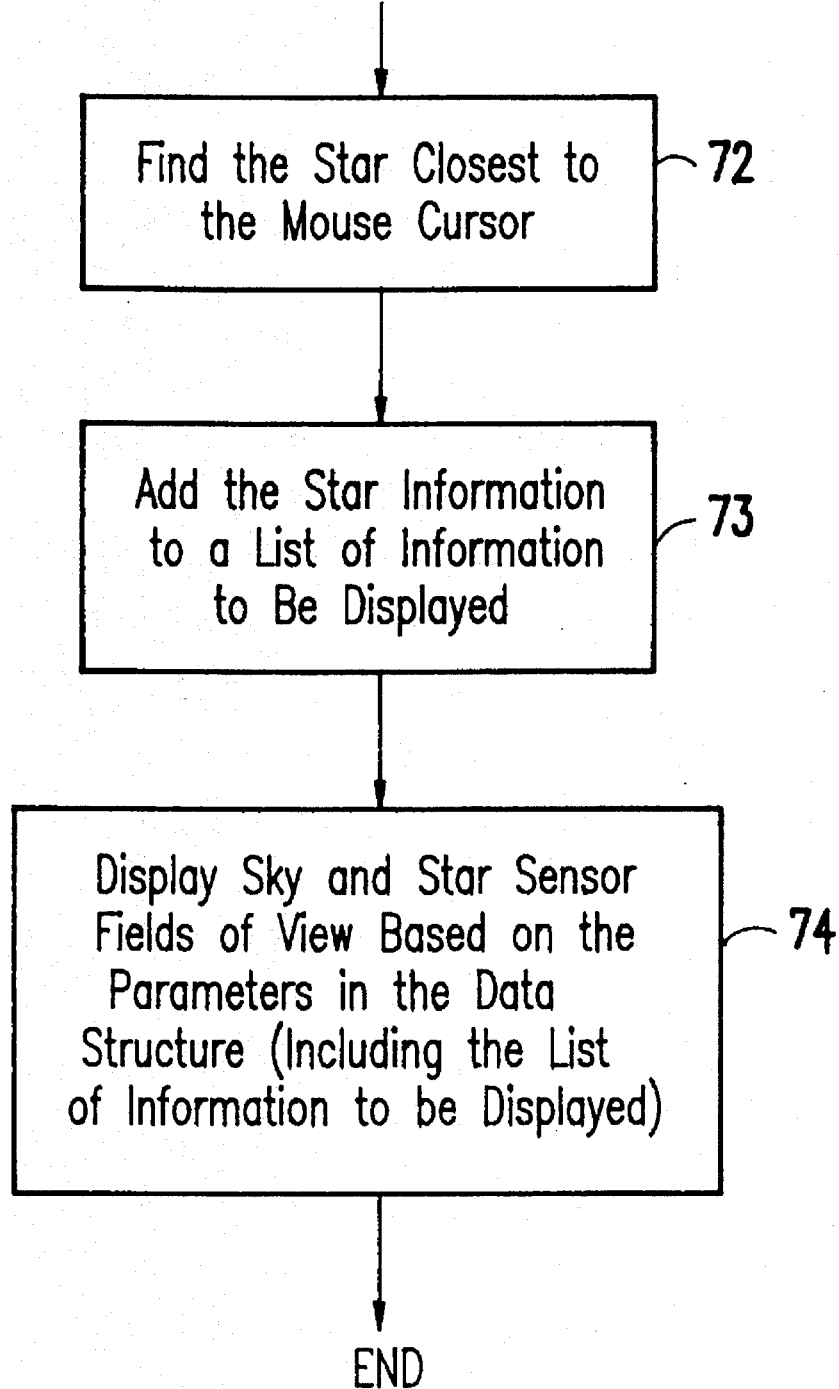
FIG. 18 is a flowchart showing the event driven logic implemented when a user points the mouse cursor at a star and presses the mouse button to obtain star identification data.

FIG. 18 is a flowchart that illustrates the logic of the software for the event of pointing the mouse cursor at a star and pressing the mouse button to identify the star. When this event is detected, the star catalog is searched for the star which appears closest to the mouse cursor in function block 72, and the star identification information is added to a list of identification (ID) information to be displayed in function block 73. This list is stored in the main data structure. The graphics are redrawn in function block 74, including the list of ID information, as shown in FIG. 9.

Between steps of the simulation, the X-Windows software 55 shown in FIG. 3 can process other events which occur, such as the moving of a slider bar, the re-sizing of a window or the changing of an orbital parameter. This is accomplished by issuing an X-Windows event called a WorkProc after each step of the simulation. The WorkProc waits until the event queue is empty and then begins the next step of the simulation. Depressing the "STOP" push button 48 removes the XWorkProc from the event queue, thereby stopping the simulation.

SECTION 12. ANIMATION

This section describes how the invention accomplishes the graphics animation, which in addition to its event-driven structure is vital to its interactive nature. The animation is accomplished using a generally known technique called color table double buffering. This technique works as follows. The color table of the graphics display is conceptually divided into two buffers. It is defined so that one buffer is visible while the other, which is being re-drawn, is hidden. When the graphics draws are complete, the color table is re-defined so that the formerly hidden buffer is now visible, while the formerly visible buffer is now hidden.

FIG. 19A illustrates how the color table would be defined for a 4-bit (16 color) graphics display. The value X in the table indicates either "1" or "0". Thus, four colors are defined to be black, four are defined to be white, and so on. The indices of the black colors are 0000, 0001, 0010 and 0011. The indices of the white colors are 0100, 0101, 0110 and 0111. The color table mask, which controls which bits may be changed in a graphics draw operation, is set to the binary value 0011, so that only the lower order bits may be changed. With this definition, the first buffer (the higher order bits) is visible while the second is hidden, and graphics draws affect only the second buffer. When the graphics draws to the second buffer are complete, the definition of the color table is changed to that of FIG. 19B. The drawing mask is now 1100, so that only the first buffer is being re-drawn while the second buffer is visible.

By following this technique, crisp and flicker-free animation sequences are produced by the invention. The invention uses 3-bit buffers (8 colors per buffer), so that a total of 6 bits (64 colors) are required of the graphics display. (The standard graphics display for the RISC System/6000 has 8 bits, or 256 colors.)

EXAMPLE OF OPERATION

Satellite analysts use the invention to plan an attitude maneuver as follows. First the estimated position and attitude of the satellite are entered to see where the star sensors are pointing in the sky and where the acquisition stars are located. Then the satellite attitude is adjusted using the roll, pitch and yaw slider bars 41, 42 and 43, shown in FIG. 1, to bring the star sensors closer to these stars. When an attitude is found where the star sensors will be able to detect several of these stars and where there will be no interference from the Earth, sun, moon or planets, the desired stellar acquisition maneuver has been found. The quaternion calculated by the computer system is used as part of the attitude maneuver command to be uplinked to the satellite.

The user can also point the mouse cursor at the acquisition stars which will be detected to get identification information. In addition, the user can determine the times at which each of these stars will be detected by running the orbital simulation and stopping it when one of these stars appears in the field of view of a star sensor.

Figure 20:
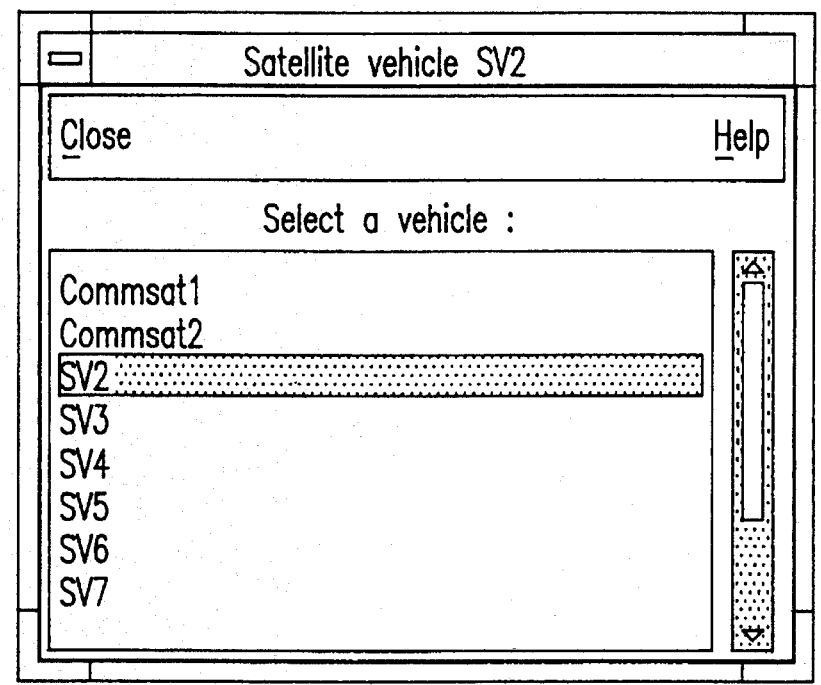
FIG. 20 is an illustration of the Satellite Vehicle Selection window which is opened by the Vehicle option from the main menu bar in the display shown in FIG. 1.
Figure 21:
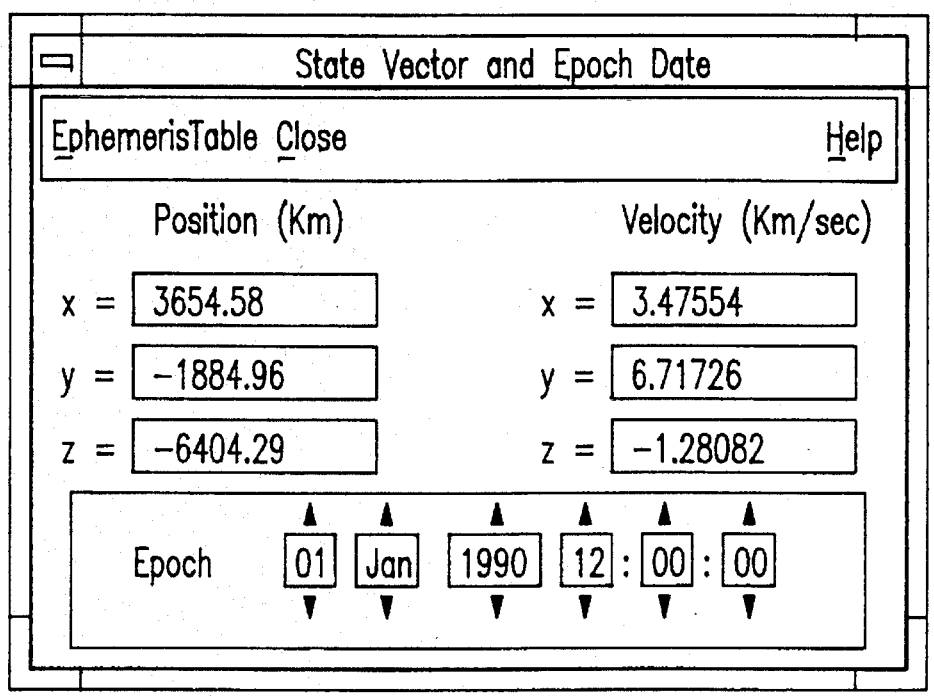
FIG. 21 is an illustration of the State Vector and Epoch window for inputting parameters by the user.
Figure 22:
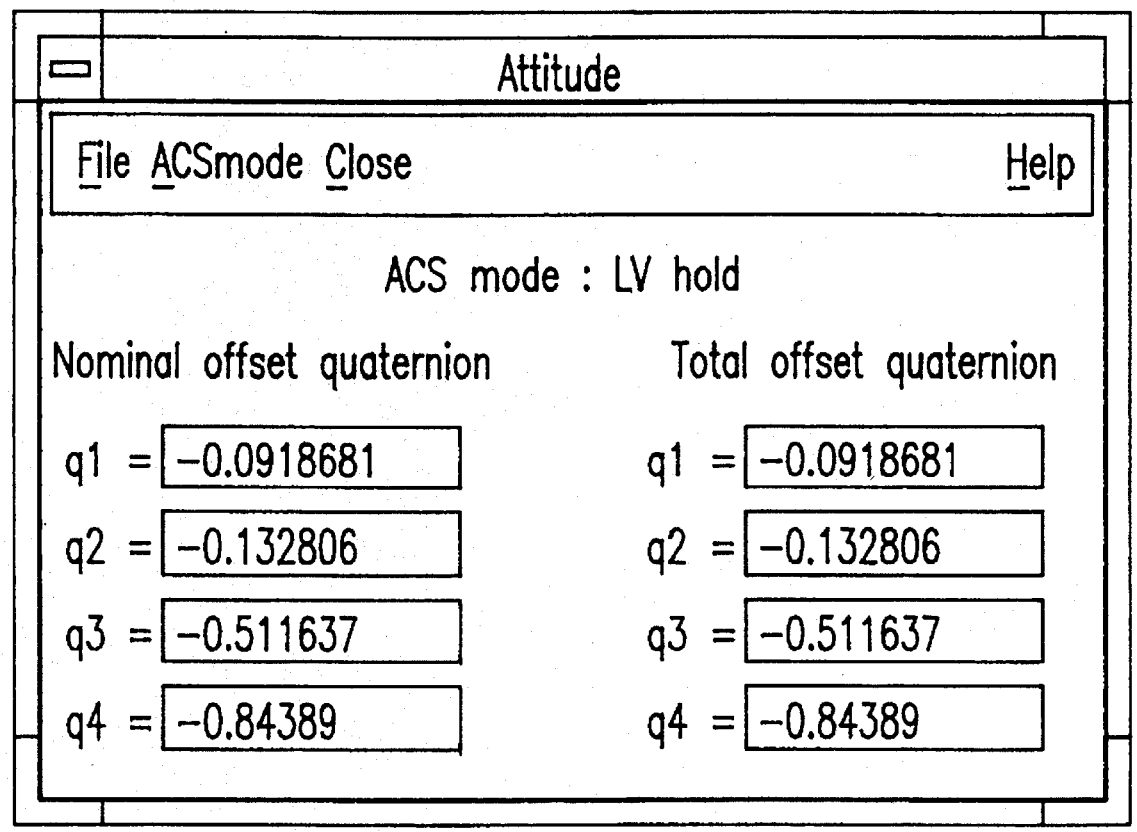
FIG. 22 is an illustration of the Attitude window for inputting parameters by the user.

To plan a satellite attitude maneuver using the invention, the Vehicle option is selected from the menu bar 47 in the control window 13 shown in FIG. 1. FIG. 20 shows an example of the Satellite Vehicle Selection window which is opened by selecting the Vehicle option. The name of a currently loaded vehicle appears on the title bar of this window, and it also appears highlighted on the list. To load a new vehicle, its name is selected from the list. The window is closed by selecting the Close option from its menu bar. Next, the source of ephemeris is selected by selecting the Parms option from the menu bar 47 followed by the State Vector & Epoch option, resulting in the display of the pop-up menu shown in FIG. 21. The user enters the state vector and the date-time of the selected satellite at epoch and closes the window. The user then selects the attitude mode (ACS mode) and offset quaternions by again selecting the Parms option from the main menu followed by the Attitude option to display the Attitude window shown in FIG. 22. The user proceeds to enter other parameters in the same fashion, including the star occultation bits as shown in FIG. 14.

Once the user has entered the various parameters, the starting date and time for the simulation are entered in the date/time text windows 46 in the control window 13 shown in FIG. 1 and the button 44 labeled "RUN" is pressed to propagate the orbit of the satellite. The user controls the speed and direction of propagation by using the slider bar 45. Alternatively, the triangular buttons above and below the data-time text windows 46 may be pressed to step the propagation in discrete time increments.

The invention can be used to solve other star-sensor-based problems. These include the following:

(1) The invention can display artificial Earth satellites in addition to stars and planets. This feature allows the user to determine contact times with communication satellites when the Earth will not block communication.

(2) The invention can be used with star-scanner types of star sensors by displaying the swath of sky covered by a star sensor on a spinning platform.

(3) The invention can be used to plan viewing times for satellite-based telescopes. It could be used, for example, to determine when a given quasar would be visible to the Hubble Space Telescope for a sixty-minute exposure without interference from the Earth, moon or sun.

(4) The invention can be given the capability to perform more complicated attitude maneuvers (such as slews, or controlled rotations) or sequences of maneuvers.

(5) The invention can be interfaced directly with satellite telemetry data to provide a visual representation of the satellite's current attitude state.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An interactive graphical attitude maneuver planning computer system for planning satellite attitude maneuvers comprising:

a graphics display comprising at least a first window displaying a map of the celestial sphere as seen from a satellite and a second window displaying graphical slider bars for varying roll, pitch and yaw angles of the satellite, graphical. "RUN" and "STOP" buttons, and text entry windows for entering date and time;

a computer running an operating system supporting a windowing function responsive to user initiated events for executing functions to process events in an interactive manner, said computer system also running an application program on said operating system and windowing function to compute an attitude matrix, determine an orientation of at least one star sensor and compute sky and star sensor field of view displays; and user input devices including a text entry device for entering date and time in said text entry windows and a pointing device for selecting and moving said graphical slider bars and selecting said "RUN" and "STOP" buttons, said windowing function responding to user inputs and interacting with said application program when said "RUN" button is selected to generate a display in said first window showing a movement of the star sensor across the sky and stars as they pass through the star sensor field of view providing the user with an immediate display of where the star sensor is pointing at any point in time of an orbit of the satellite.

2. The interactive graphical attitude maneuver planning computer system recited in claim 1 wherein the celestial sphere displayed in said first window in which the horizontal (x) axis of the display measures the Right Ascension angle and the vertical (y) axis measures the Declination angle and said application program computes the display of the celestial sphere in an Orbit Normal coordinate frame in which the plane of the satellite's orbit is the same as the x-y plane of the celestial sphere and said windowing function displays the field of view of the star sensor moving horizontally across said graphics display.

3. The interactive graphical attitude maneuver planning computer system recited in claim 2 wherein said graphics display further includes one or more additional windows, one for each star sensor on the satellite, said additional windows displaying fields of view of a corresponding star sensor and the stars which are visible to the star sensor.

4. The interactive graphical attitude maneuver planning computer system recited in claim 2 wherein said second window further displays time-step slider bar which is selectable by the user using the pointing device and movable in forward and backward directions causing a displayed orbit of the satellite to move forward or backward in time.

5. The interactive graphical attitude maneuver planning computer system recited in claim 2 wherein said first window shows, in addition to stars, a region of the sky occluded by the Earth and interference regions around the moon, sun and planets in which the star sensor should not point.

6. The interactive graphical attitude maneuver planning computer system recited in claim 5 wherein said computer stores a data file containing tables storing star and planet data, said data file being accessible by said windowing function, and said windowing function responding to the user selecting a star or planet displayed in said first window with said pointing device and accessing said tables to display star or planet identification information.

7. The interactive graphical attitude maneuver planning computer system recited in claim 6 wherein said data file further contains satellite parameters and wherein said second window further displays a menu bar providing options which may be selected by the user using the pointing device which, when selected, the windowing function displays a pop-up menu allowing further user selections including satellite parameters which, when input by the user, are stored in said data file.

8. A computer interactive method of displaying satellite attitudes to facilitate planning satellite attitude maneuvers comprising the steps of:

generating a first window on a computer display screen in which a map of the celestial sphere as seen from a satellite is displayed, wherein the horizontal (x) axis of the display measures the Right Ascension angle and the vertical (y) axis measures the Declination angle and the celestial sphere is computed in an Orbit Normal coordinate frame in which the plane of the satellite's orbit is the same as the x-y plane of the celestial sphere and the field of view of a star sensor on the satellite is displayed moving horizontally across the graphics display;

generating a second window on the computer display screen in which graphical slider bars for varying roll, pitch and yaw angles of the satellite, graphical "RUN" and "STOP" buttons, and text entry fields for date and time entry are displayed;

providing a user with a pointing device for selecting said graphical slider bars and a "RUN" button displayed in said second window, and for selecting stars displayed in said first window and a third window;

providing the user with a text entry device for entering date and time in said text entry fields;

responding to movement of a slider bar by the user using said pointing device by reading roll, pitch and yaw angles from the graphical slider bars, computing an attitude matrix and star sensor orientations, and displaying sky and star sensor fields of view in said first window; and responding to an input of date and time by the user making text entries in said text entry fields with said text entry device and a press of the "RUN" button by the user using said pointing device by adding a time step value to a current date and time, calculating positions of sun, moon and planets based on current date and time, calculating position and velocity of the satellite, computing an attitude matrix and star sensor orientations, and displaying sky and stars in said first window as they pass through the star sensor field of view providing the user with an immediate display of where the star sensor is pointing at any point in time of an orbit of the satellite.

9. The interactive computer method recited in claim 8 further comprising the step of generating one or more additional windows on the computer display screen in which a corresponding field of view of one or more star sensors and the stars visible to the star sensors are displayed.

10. The interactive computer method recited in claim 8 further comprising the steps of:

generating a time-step slider bar in said second window which is selectable by said pointing device; and responding to a movement of said time-step slider bar by the user in a forward or backward direction by computing and displaying a field of view as an orbit of the satellite is moved forward or backward in time.

11. The interactive computer method recited in claim 8 further comprising the steps of:

computing, in addition to positions of stars in the field of view displayed in said first window, regions of the sky occluded by the Earth and interference regions around the moon, sun and planets in which the star sensor should not point; and displaying in the first window the region of the sky occluded by the Earth and the computed interference regions.

12. The interactive computer method recited in claim 8 further comprising the step of responding to a selection of a star using said pointing device by finding the star closest to a cursor controlled by said pointing device, and displaying star or planet identification information.

* * * * *